United States Patent Office 3,846,116

Patented Nov. 5, 1974

3,846,116

METHOD FOR TREATING A PEANUT CROP

Melton T. Pearson, Fulton, Tex., assignor to Standard Spray and Chemical Company, Lakeland, Fla.

No Drawing. Continuation of application Ser. No. 801,855, Feb. 24, 1969, which is a continuation-in-part of application Ser. No. 748,217, July 29, 1968, both now abandoned. This application May 29, 1973, Ser. No. 364,586
Int. Cl. A01n *5/00, 11/02*
U.S. Cl. 71—65 31 Claims

ABSTRACT OF THE DISCLOSURE

Various compositions comprised of calcium-containing compounds of diminished particle size, preferably in combination with fungicides, insecticides, herbicides, and mixtures thereof are used effectively in the treatment of peanut plant foliage to prevent the formation of "pops" and unsound kernels.

CROSS-REFERENCE TO PARENT APPLICATION

This application is a continuation of copending application Ser. No. 801,855, filed Feb. 24, 1969, which in turn is a continuation-in-part application of copending application Ser. No. 748,217, filed July 29, 1968, both of said application now abandoned.

This invention relates to novel compositions. More particularly this invention relates to novel compositions which preferably include fungicides, insecticides, herbicides, and mixtures thereof, which compositions are useful in the treatment of peanut crops.

For many years the peanut industry has been troubled by the problem of "pop" and unsound kernel formation during the growth of a peanut crop. The term "pop" is well understood in the art and refers to a peanut shell which forms and in which no peanut develops. The formation of these "pops" and nuts having unsound kernels obviously decreases the effective yield of a given crop and thus are bothersome indeed.

Although the exact biological reason for the formation of "pops" and unsound kernels is not known at the present time, it was known as early as 1800 that if the earth surrounding a peanut plant is treated with some form of calcium-containing compound the problem of "pop" and unsound kernel formation could be materially reduced. In recent years this land treatment has been refined to a highly sophisticated degree. Such a treatment is currently referred to by those in the industry as landplastering. Landplastering as used today consists of spreading large quantities of an inorganic calcium salt (e.g. CaO, $CaCO_3$ and preferably $CaSO_4$) on the ground surrounding the peanut plant. Experts in the use of this landplaster technique advocate the criticality of both the time and place at which the calcium salt must be applied if the technique is to be effective. Generally speaking, current expert opinion is that to be at least operative and at best, effective, the calcium salt must be applied at early bloom to the soil at the base of the plant in order to insure that calcium is present at the points of pegging when it occurs. This is usually accomplished by applying a 16-inch band of the salt to the soil centered over the plant row. As is well known, "pegging" is a term used in the peanut industry to describe that process which occurs wherein the bloom-shoots of a peanut plant bend downward from their basically upright position and seek entry into the earth to thereby form "pegs" in the earth from which peanut pods will grow. Although such landplaster techniques have proved useful in diminishing the problem of "pop" and unsound kernel formation, they do require the use of large quantities of the calcium salt and thus result in high costs. For example, it has been found that in most peanut producing areas, about 500 to 1000 lbs. per acre of the prefered compound gypsum (commercially available $CaSA_4$, having particle sizes of about 100 to 200 microns), must be applied to the soil in order to substantially eliminate the formation of "pops" and unsound kernels by landplaster techniques. For most other calcium salts equal or greater amounts per acre are required to achieve the same results.

From the above discussion, it is seen that there exists a need in the art for new compositions and treatments which will effect a substantial elimination of "pops" and unsound kernels at least equal to the effect obtained when using landplaster and at the same time reduce the cost which currently must be incurred to eliminate this problem.

The invention now presented and described herein fulfills the above-described need of the art in that it provides the art with new compositions and methods of treatment which will effect a substantial elimination of the formation of "pops" and unsound kernels during peanut crop production and at the same time reduce the cost which must be incurred to eliminate this problem.

The basic composition as contemplated by this invention is comprised of a calcium-containing compound of reduced particle size. By reduced particle size is meant particles having a size of about 20 microns or less, preferably of submicron size. Such basic compositions may be in dust, powder, slurry, or other conventional form. Preferably such compositions also include fungicides, insecticides, herbicides, and mixtures thereof.

The novel techniques as contemplated by this invention generally comprise contacting the foliage of a peanut crop with the above described compositions to thereby reduce the number of "pops" and unsound kernels formed in a particular peanut crop. In most instances, from about 15 to about 80 pounds per acre of a calcium-containing compound having a particle size of about 20 microns or less, preferably of about 2 microns or less, and most preferably of sub-micron size, and preferably from 20 to 75 pounds per acre, are all that is necessary to apply to the foliage of a peanut crop in order to substantially eliminate the problem of "pops" and unsound kernels. Such an acomplishment is indeed surprising and unexpected when compared to the beliefs heretofore adhered to by the prior art which advocate the criticality of having to have calcium present at the spot on the ground at which pegging occurs if "pops" etc. are to be eliminated. Quite to the contrary and according to this invention, all that need be done, in most instances, is to contact the foilage of a peanut plant with a calcium-containing compound of a particular particle size as above described in lesser amounts than heretofore used and substantially the same general results will be achieved.

The exact biological mechanism by which this invention eliminates or substantially reduces the amount of "pops" and unsound kernels formed is not entirely understood. A few theories, not intended as limiting upon this invention, have been proposed to explain this phenomenon. According to one theory, the calcium-containing compound of reduced particle size is assimilated by the foliage of the peanut plant and is carried by the plant cells to a point where it retards or kills microorganisms, fungus, or some other pestilence which might otherwise prevent nuts and/or sound kernels from forming. If this theory is correct, the calcium-containing compound actually serves as a pesticide in the plant, According to another theory, the plant, after assimilation of the calcium-containing compound, carries it to a point where it catalyzes the formation of the nut and its kernel. If this theory is correct, the calcium-containing compound is not a pesticide, but rather is a biological catalyst for the system.

According to still another theory, the calcium in the calcium-containing compound may actually serve as a building block in the formation of the nut and/or the entire plant itself. If this theory is correct, the calcium-containing compound serves as a nutrient not only for the nut but for the plant as a whole. It is, of course, quite possible that each of these theories might be true in that the calcium-containing compound may be acting simultaneously as a pesticide, a nutrient, and/or a catalyst in the system.

Regardless of whether or not the above theories are correct, the treatment of the foliage of a peanut crop with a calcium-containing compound of reduced particle size, preferably mixed with fungicides, insecticides, herbicides and mixtures thereof and applied whenever these latter materials are normally applied to a peanut crop, effectively reduces and in many instances substantially eliminates the problem of "pops" and unsound kernel formation.

As described hereinabove, the basic compositions contemplated by this invention are comprised of particles of a calcium-containing compound having a size of about 20 microns or less, preferably of about 2 microns or less, and most preferably of submicron size. The form or type of calcium-containing compound useful in this invention may be any one or a combination of the well known forms and types of calcium which are currently available. Preferably, the calcium-containing compounds used are inorganic calcium salts (including oxides). Some examples of the inorganic calcium-containing salts which may be used in this invention include calcium oxide (CaO), calcium carbonate ($CaCO_3$), and calcium sulfate ($CaSO_4$). Mixtures of two or more of these calcium-containing salts may, of course, also be employed. Typical examples of commercially available oxide and calcium carbonate are basic slag and lime respectively.

Although many different forms and types of calcium-containing compounds are useful herein, the preferred form of the compound for purposes of this invention is calcium sulfate. Calcium sulfate is a well known compound available in many forms, all of which are useful for the purpose of this invention. For example, the calcium sulfate used may be in its anhydrous form or in the form of either of its two hydrates, the dihydrate, $$CaSO_4 \cdot 2H_2O$$

and the hemihydrate, $CaSO_4 \cdot \frac{1}{2}H^2O$. The calcium sulfate used, furthermore, may be either a pure form of one of these three salts or it may be a crude or natural form thereof. Gypsum, the naturally occurring crude dihydrate of $CaSO_4$, has been found especially preferred for use in this invention since it is readily obtainable in bulk as a commercial product and it is easily ground to the necessary particle size. Other forms of $CaSO_4$ which may be used include plaster of Paris (the hemihydrate formed by calcining gypsum) and anhydrite (occurring as a mineral and prepared in both insoluble and soluble forms by dehydration of gypsum). Also included are such well known sources of $CaSO_4$ as alabaster, selenite (a pure form of gypsum), satin spar (a pure crystalline form of gypsum), gypsite, and the like.

Although it has been found that the above described calcium-containing compounds of reduced particle size may be used alone to achieve the results of this invention hereinbefore set out, it has been found very desirable to include with the calcium-containing compounds, one or more of a member selected from the group consisting of fungicides, insecticides, herbicides, and mixtures thereof which when used in combination with the said calcium-containing compounds serve to form compositions which not only reduce or substantially eliminate the formation of "pops" and unsound kernels but also act as general or selective pesticides as well.

The amount of pesticide used in combination with the calcium-containing compounds will of course depend upon the requirements of the particular crop being treated and the equipment available for treatment. For example, if a particular crop requires 30 pounds per acre of calcium sulfate, and also requires 10 pounds per acre of a particular pesticide applied three times during the growing season, the mixture used will be one pound of calcium sulfate per one pound of pesticide. If the equipment used to apply the mixture is then set to apply 20 pounds of the mixture per acre and the mixture is applied three times during the growing season, the crop will be treated effectively by a mixture ratio of 1:1. Other ratios higher and lower than 1:1 are also useful. For example, ratios of about 15 parts by weight of calcium sulfate per one part by weight of pesticide are in some instances necessary or desired. Ratios as low as 0.5 parts of $CaSO_4$ per part of pesticide may also be necessary. As stated above, and as is clear to the skilled artisan, such ratios will be adjusted to meet the particular requirements of a given crop, etc.

Examples of fungicides, insecticides, and herbicides which may be used in the compositions of this invention are well known in the art. Generally speaking, any of these materials which may be, or are being, used alone on a peanut crop may also be used in combination with particles of calcium sulfate of the type hereinbefore described.

The term "herbicide" as used herein is meant to define these compounds in their broadest sense in that it includes both compounds which kill plant life as well as compounds which serve as growth regulators of plant life including growth regulators for the peanut plant itself. Some specific examples of herbicides useful in the compositions of this invention include such well known selective herbicides as the selective pre-emergence herbicide N,N-dimethyl - 2,2 - diphenyl-acetamide (sold under the trade names Dymid and Enide), the weed killer 3-tert-butyl-5-chloro-6-methyluracil (sold under the trade name Terbacil), the selective preemergence herbicide 2,4-dichlorophenoxy (ethyl) phosphite and the herbicide dinitrobutylphenol (sold under the trade name DNEP). It is understood, of course, that since the compositions of this invention are applied so that at least a portion of them will contact and preferably adhere to the foliage of peanut plants, the herbicide used will be selective so as not to reduce the yield of the peanut crop.

Some specific examples of fungicides useful in this invention include such well known fungicides as copper oxide, copper oxychloride, basic copper sulphate, the dithiocarbamates, such as manganese and zinc ethylenebis-dithiocarbamate,N,trichloromethylmercapto - 4-cyclohexane-1,2-dicarboximide, N-trichloromethylmercaptophthalimide, tetrachloroisophalonitrile, copper hydrate, copper ammonium carbonate, dodine, sulphur, liquid copper salts and copper carbonate basic.

Examples of insecticides useful in the compositions of this invention include such well known insecticides as sulfur, chlorinated hydrocarbons, organic phosphates and carbamates. Of course it is understood that many of these compounds may also act as miticides, ovicides, fungicides and bactericides. Therefore, the term "insecticide" as used in this invention serves to define a material which is insecticidal, miticidal, ovicidal, and/or bactericidal, and which may also have some fungicidal effect as well. Examples of such insecticides include DDT (dichlorodiphenyl-trichloroethane), Parathion (o,o-di-ethyl-o-nitrophenyl phosphorothioate) and carbaryl (1-naphthyl-N-methyl-carbamate).

As alluded to hereinabove, the compositions of this invention may assume many physical forms. For example, they may be dusts or powders of the calcium-containing compounds alone or in combination with one or more of the above-described pesticides. Such dusts or powders are easily formed by any conventional technique. In this respect it is important that the calcium-containing compound be reduced to a particle size as described above. The reduction of the compound to a suitable particle size may be accomplished by any well known technique for grinding or comminuting solid particles of matter generally. Examples of particularly preferred methods for effecting comminution of the compound include dry grinding by air milling the particles, Raymond milling the particles, or wet grinding by first slurrying the particles and then grinding this slurry in a ball mill. Each of these techniques has proved useful and is preferred for the purpose of this invention.

When the calcium-containing particles of reduced particle size are used alone to make up the dust or powder for application to the foliage of a peanut crop, no further treatment need be done other than comminuting as described above. When the calcium-containing compound is used in combination with a pesticide, it may be pre-comminuted and then added to the pesticide or the mixture of pesticide and calcium-containing compound may be comminuted. Unless it is required that the pesticide be comminuted because of its own characteristics or if a high degree of homogeneity is desired in the mixture, the calcium-containing compound is preferably pre-comminuted and then mixed with the pesticide since less material need be comminuted than if the entire mixture were reduced in particle size.

A particularly preferred example of a dust or powder composition according to this invention consists of a mixture of copper and sulfur, as the pesticide and particles of calcium sulfate having a size of about 5 microns or less. Such a mixture is formed by first comminuting the calcium by dry grinding it in a conventional air mill and then mixing it with the copper and sulfur in a ratio of about 2.5 parts by weight of copper to about 40 parts by weight sulfur to about 50 parts by weight $CaSO_4$. This composition may also be modified by including therein about 3 parts by weight of DDT as an insecticide.

The above composition may be further modified by adding thereto a small amount of an ether such as ethylene glycol ethyl ether, diethylene glycol ethyl ether, and diethylene glycol methyl ether. Although the exact function of such ethers is not known, it is believed that they function as carriers or mobilizers which help the plant assimilate the calcium or calcium-containing compound and thereby increase the effectiveness of the foliage treatment of this invention. Generally speaking, one or more of the above ethers may be used in this compositions in ratios ranging from about .001 to .05 parts by weight of ether to one part by weight of the composition.

Another example of a form which the compositions of this invention may assume is a simple slurry. Such a slurry may generally be formed by admixing a pre-comminuted amount of a calcium-containing compound with water or other suitable liquid vehicles and agitating the mixture thoroughly to thereby form the slurry. Such a slurry may also be formed in a wet-grinding operation wherein the grinding of the calcium-containing particles to the desired particle size is done in situ in a liquid vehicle, preferably water. This wet-grinding technique forms a type of slurry which may then be diluted by further addition of liquid as found necessary to meet particular soil conditions. It is, of course, understood that regardless of how the slurry is formed, it may also have included therein one or more of the above-described pesticides. The ratio of liquid to solids in the slurries as contemplated by this invention may vary widely depending upon the treatment in which it is to be used, the amount of stability required, the type of equipment available to apply it to the peanut foliage, and the like. A particularly preferred slurry for the purposes of this invention, and one which is found readily sprayable by conventional farm equipment currently used to apply other types of sprays, in an aqueous slurry which contains 7.5 lbs. of dispersed 90% crude air-milled $CaSO_4$ (crude gypsum) per gallon of spray.

Still another form which the compositions of this invention may assume is a lignin sulfonate paste or dispersion. Such pastes and dispersions are particularly preferred for purposes of this invention since they are relatively stable and easily applied to the plants. In addition, it has been found that these pastes and dispersions readily adhere to the foliage of a peanut crop and thus better assure that adequate contact of the compositions with the crop will be achieved. Such adherence properties are, of course, very useful in geographical areas where high winds and large amounts of rain are prevalent.

Lignin sulfonate compositions according to this invention may be made by any convenient technique. Generally speaking, lignin sulfonate, a well known commercially available compound, is admixed with the calcium-containing compound of a reduced particle size and this admixture is then mixed with sufficient water to form it into a paste or a dispersion. The choice between paste and a more dilute mixture, herein referred to as a dispersion, will depend, of course, on the type of equipment available for effecting the treatment and the length of time that the composition is to be stored prior to use. With respect to this latter criterion, it is most advantageous for storage purposes to formulate the composition either as a dry powder or a paste for storing and then just prior to actual use, add the desired amount of water thereto.

Although the ratio of lignin sulfonate to calcium-containing compound may be varied over a wide range depending upon the conditions of soil and environment encountered, it has been found that for most situations the calcium-containing compound should be present in a greater amount by weight than the lignin sulfonate. That is to say, for most situations the weight ratio of compound to lignin sulfonate should be greater than 1 to 1. Preferably the ratio is greater than about 5 to 1. A particularly preferred example of these lignin sulfonate compositions is comprised of 5% by weight lignin sulfonate and 95% by weight of 90% crude $CaSO_4$ (crude gypsum) having a particle size of about 2 microns.

Although the exact function of the lignin sulfonate in the compositions of this invention is not known, it is believed that such a material may actually form a complex with calcium-containing compounds such as $CaSO_4$ and thus aid both its adherence to the foliage of a peanut crop and its assimilation therein. It is, of course, understood that the above-described lignin sulfonate compositions may also include one or more pesticides as above described to thereby form a more versatile treating composition.

Many other forms for these compositions will become evident to the skilled artisan once given the above disclosure. For example, calcium-containing compounds such as $CaSO_4$, with or without the above pesticides, may be admixed with various gelling agents and other well known ingredients to form thixotropic sprays. The formation of such thixotropic sprays are well known in the art, and are easily adapted for use in this invention by incorporating with the initial ingredients the desired amount of compound and pesticides.

As alluded to hereinabove, and regardless of the form of the calcium-containing composition used, it has generally been found that to be effective there must be provided from about 15 to 80 lbs. per acre of the calcium-containing compound having a particle size less than about 20 microns. By the term "effective" is meant the reduction or substantial elimination of the problem of "pop" and unsound kernel formation. In this respect it should be noted that the exact amount of calcium-containing compound used will depend upon the soil conditions of a particular area. That is to say, if the soil of a particular area is high in calcium content, less compound will be needed here than is needed in areas of low calcium content.

The compositions of this invention may be applied to the foliage of a peanut crop by any conventional technique such as spraying or dusting and the like. The type of equipment used may be any well known equipment conventionally used to apply to the foliage of a crop a particular form of chemical. The compositions of this invention may be applied all at once during early bloom so as to provide the total amount of calcium-containing compound required for the entire growing season from the very start. Preferably, however, and especially when the calcium-containing compound is used in combination with one of the above-described pesticides, the total amount of compound is equally divided into a number of applications which number corresponds with the number of pesticide treatments to be effected over the growing season. For example, if a particular pesticide is to be applied seven times a year, the amount of calcium-containing compound required will be divided into seven equal segments, admixed with the pesticide and applied whenever the pesticide would normally have been applied. Even without the combination of pesticides therein, the compounds of this invention may be applied in divided segments. Preferably, and regardless of whether pesticides are included therein, the calcium-containing compounds are first applied starting from early bloom and extending up until about a week before harvest. For example, it is very advantageous to use 7–8 lbs./acre treatment, three or four times a year when there is required a calcium compound foliage treatment of from about 21 to 32 lbs./acre per crop. The first applicaton usually is effected as soon as bloom-shoots appear and the remaining two or three treatments are then equally spaced over the rest of the growing season. Of course, it is understood, that more than four applications may be used as is sometimes the case when pesticides are used in the basic compositions of this invention.

It is also quite conceivable, and thus it is contemplated as part of this invention, that the unique above-described foliage treatment of this invention may be used in combination with the well known landplastering technique to effect improved results. For example, excellent results are achievable by landplastering a peanut crop at the beginning of the bloom as heretofore done by the art and then supplementing the landplaster with foliage treatments from time to time throughout the growing season. Although there is actually experienced an extra cost, added insurance against pops, unsound kernels and thus a higher yield will usually more than justify the cost. In this respect, it may be noted that regardless of whether or not the landplaster technique is used, the use of the foliage treatment of this invention results in an added plant response which is very often recognizable by more vigorous plants, thicker plant stems, more blooms, healthier pegs, and increased yields. With respect to this latter characteristic, it has been found that in many instances yields are increased both qualitatively and quantiatively by using the technique of this invention rather than the conventional landplaster technique.

In many instances the unique combination as described above of the landplaster technique and the basic foliage treatment of this invention, need not result in additional costs and, indeed can be effected at a reduced cost. Such a reduction in cost is achieved by using a lower initial amount of landplaster than was heretofore throught necessary. Since the foliage treatment in most instances is at least equally as effective as landplaster, using less material, less overall plaster need be used. Even in those instances where landplastering is still found to be necessary rather than just merely desirable, less plaster may usually be used due to the supplementing affect of the foliage treatment. Such combinations are particularly useful in areas where only a small amount of calcium-containing compound is required to reduce the problem of "pops" and unsound kernels. This is due to the fact that for small amounts of calcium-containing compound almost all of it may be initially applied by landplaster and the cost of reducing the particle size of the small amount needed if foliage treatment were used, may thereby be saved to the extent that only supplemental batches of the basic compositions of this invention need be used.

A particular example of the above-described unique combinatiation which may be advantageously used is to, at early bloom, initially landplaster a peanut crop in a conventional manner with about 250 to 500 lbs./acre of commercially available gypsum (particle size of approximately 100 to 200 microns) rather than the required 500 to 1000 lbs./acre amount and then supplement this with three or four equally spaced foliage treatments over the growing season using 4 to 5 lbs./acre of $CaSO_4$ in one of the above-described forms of the compositions of this invention.

The following examples further illustrate the invention as hereinabove disclosed. As such they are not intended as limitations on this invention whose scope is to be determined by the subsequently provided claims.

EXAMPLE 1

A large field of farm land located at Route 3 in Tifton, Ga. was split into 32 plots of 300 square feet each (i.e., each plot approximately 1/145 of an acre). An alleyway for equipment was formed in the middle of the plots so that there were 16 plots, side-by-side, on each side of the alleyway. Each plot was 50 feet long. Alleyways running parallel with the dividing alleyway were provided along the outside of each row of 16 plots and border rows were provided at each side of the 16 plots.

Soil analysis prior to planting revealed that the field consisted of Norfolk loamy sand having a medium fertility level of phosphorous and potassium. Analysis also revealed that the field had been limed with dolomite lime 2 years prior to this test.

Prior to planting, all plots were treated with a conventional dosage of S-propyl dipropylthiocarbamate, a well known weed control agent sold under the trademark Vernam.

In early April, one hundred and ten pounds (per acre basis) of Florigiant variety peanuts were planted longitudinally in each of the 32 test plots, 2 rows to a plot. The rows were alternately spaced 40 inches and 36 inches apart with tractor wheels set 72 inches apart to facilitate late season spray or dust applications. Thus the test field consisted of two test areas (hereinafter referred to as area A and area B). Each test area, in turn, consisted of 16 test plots, each plot being 50 feet long and having two longitudinal rows of peanuts therein.

For testing purposes test area A was designated for dust treatment while test area B was designated for spray treatment. The 16 plots in each area were formed into a randomized block design to test one of 4 procedures. The randomized design for each area consisted of 16 replicate plots which from left to right were numbered 2, 4, 3, 1, 3, 1, 2, 4, 2, 1, 3, 4, 3, 2, 4, 1. The numbers indicate the type of treatment applied to a particular plot. The treatments are as follows:

TABLE I

[Area A, dust treatments]

| Treatment No. | Chemical applied |
|---|---|
| 1 | Conventional landplaster plus 6 applications of dust fungicide. |
| 2 | 20 lb./a. of dust No. 1. |
| 3 | 20 lb./a. of dust No. 2. |
| 4 | 30 lb./a. of dust No. 1. |

The fungicide used in treatment No. 1 was a conventional 3.4–90 CuS dust fungicide having an average particle size of about 44 microns. Dust No. 1 consisted of a mixture of CuS fungicide and $CaSO_4$ as follows: 40 parts (by weight) $CaSO_4$ having an average particle size of about 5 microns, 45 parts (by weight) sulphur and 3.2 parts (by weight) copper oxide (2.4 parts by weight copper as metallic). Dust No. 2 consisted of a like mixture of CuS fungicide and $CaSO_4$ as dust No. 1 except that it also had added thereto 1% (of total weight) diethylene glycol ethyl ether.

Treatment No. 1 simulated conventional landplaster. The landplaster consisted of 1,000 lb./A of 72% calcium sulfate (gypsum) applied on the first day of treatment according to conventional landplaster techniques hereinbefore described.

TABLE II

[Area B, spray treatments]

| Treatment No. | Chemical applied |
|---|---|
| 1 | Landplaster plus 6 applications of 1 gal. fungicide spray per application. |
| 2 | 1 gal. fungicide spray and 1 gal. No. 1 spray, per application. |
| 3 | 1 gal. fungicide spray and 2 gal. No. 1 spray, per application. |
| 4 | 1 gal. fungicide spray and 1 gal. No. 2 spray, per application. |

The landplaster used was the same as was used in treatment No. 1 of Area A. The fungicide spray used was a liquid spray whose dry basis analysis is 50.0% by weight sulfur, 4.0% by weight basic copper sulfate (copper as metallic, 2.12%) and 46.0% by weight inerts. As a liquid, the fungicide contains 6.0 pounds of sulphur per gallon and 0.48 pounds of basic copper sulphate per gallon. No. 1 spray consisted of 7.5 lbs. per gallon of $CaSO_4$ having an average particle size of about 2 microns. Spray No. 2 consisted of 7.5 pounds per gallon of $CaSO_4$ having an average particle size of about 2 microns and 1% (by weight of spray) diethylene glycol ethyl ether. Both sprays and the liquid fungicide were aqueous dispersions. In treatments 2–4 the fungicide and $CaSO_4$ spray were admixed and sprayed upon the peanut crop as a single spray.

The first application for all treatments was applied on June 1st. Subsequent applications for all teratments were made from 7 to 14 days between each application until at total of 6 applications were made throughout the growing season as follows:

Application No. 1: June 1
Application No. 2: June 14
Application No. 3: June 25
Application No. 4: July 6
Application No. 5: July 20
Application No. 6: July 31

Dust treatments were applied with a hand duster containing a very small compartment which could be emptied by self-cleaning between each replicate application. All dust treatments were applied when the air was calm to minimize contamination between replicates and treatments. Dusting and spraying in the convention practice is performed with the use of a tractor. Since dusting in this case was performed with a hand duster, a tractor was used to run down all middles in the dust range after each application to produce any mechanical damage to peanut limbs, thereby making the dust test comparable to the spray test from the standpoint of mechanical plant injury.

Spray treatments were applied with a tractor mounted 2-row sprayer equipped with a backflush and an 8 roll nylon roller pump. Three nozzles per row were used, one over the center of the row and one set with a slight angle on each side of each row. All nozzles were adjusted 6 inches to 8 inches from peanut foliage for all applications. Spray pressure consisted of 80 lbs. per sq. inch with tractor operated at 4 miles per hour. D–3–23 disc and cores were used in the nozzles to produce a delivery rate of approximately 20 gals. of spray dilution per acre per application.

All of the 16 test plots were plowed up on August 16th. Due to heavy soil moisture conditions, the harvested crop was shook and inverted by hand the following day with practically no harvesting losses. All treatments and plots were combined, seven days later, on August 24, with an average moisture content of 8%. Plot weights were multiplied by 145 to obtain per acre yields and the yields were averaged to give the yield per acre of a given treatment. In accordance with standard practice in the industry, representative samples from each treatment were submitted to the Federal-State Inspection Service for market price determination. The physical and economic yields of each treatment were as follows:

TABLE III

| Test area | Treatment No. | Plot yield (lbs./A.) | Average plot yield (lbs./a.) | Average value of crop per a. ($) |
|---|---|---|---|---|
| A | 1 | 2,465 | 2,338 | 296.82 |
| A | 1 | 2,320 | | |
| A | 1 | 2,030 | | |
| A | 1 | 2,538 | | |
| A | 2 | 2,465 | 2,610 | 332.40 |
| A | 2 | 2,683 | | |
| A | 2 | 2,393 | | |
| A | 2 | 2,900 | | |
| A | 3 | 2,393 | 2,357 | 284.13 |
| A | 3 | 1,885 | | |
| A | 3 | 2,393 | | |
| A | 3 | 2,755 | | |
| A | 4 | 2,683 | 2,502 | 309.95 |
| A | 4 | 2,248 | | |
| A | 4 | 2,103 | | |
| A | 4 | 2,973 | | |
| B | 1 | 2,900 | 2,429 | 310.83 |
| B | 1 | 2,465 | | |
| B | 1 | 2,030 | | |
| B | 1 | 2,320 | | |
| B | 2 | 3,045 | 2,683 | 316.24 |
| B | 2 | 2,900 | | |
| B | 2 | 2,175 | | |
| B | 2 | 2,610 | | |
| B | 3 | 3,263 | 2,719 | 331.85 |
| B | 3 | 3,118 | | |
| B | 3 | 2,538 | | |
| B | 3 | 1,958 | | |
| B | 4 | 2,973 | 2,756 | 334.27 |
| B | 4 | 2,973 | | |
| B | 4 | 2,393 | | |
| B | 4 | 2,683 | | |

EXAMPLE 2

In Northhampton County, North Carolina, a large field, which during the previous year had yielded a corn crop and which was therefore ready for crop rotation with peanuts, was selected. The soil in the field consisted of Norfolk Sandy Loam soil with a soil analysis as follows: pH 5.7; Ca24; $HP_2O_556$; $K_2O$–L 22; $M_n$ 6; O.M. 7. The field was fertilized, prior to breaking with 1,000 lbs. of dolomitic lime per acre and 500 lbs. of 0–9–27 (percent N–P–K). In early May, Florigiant peanut seeds (third year from breeder) were treated with Botran (fungicide of 2,6-dichloro-4-nitroaniline) and Captan (fungicide of N - trichloromethylthio-4-cyclohexene-1,2-dicarboximide) according to conventional techniques. The seeds were then planted over the field at the rate of 90 lbs. per acre in 36″ row spacings. The soil was then treated, according to conventional practice, with ¾ gallon per acre of active Nemagon (soil fumigant of dibromochloropropane) in the row applied 6″ below the seed plus 7 lbs./acre of Thimet (systematic insecticide of O,O-diethyl, S-(ethylthio)-methylphosphorodithioate) in the boot of the furrow with the seed. In addition, Vernam (herbicide of S-propyl dipropythiocarbamate) was applied at cracking time at the rate of 1¼ lbs./acre and incorporated into the soil with a power driven rotary hoe. The herbicides, Enide (N,N-dimethyl-2,2-diphenylacetamide) and Dinitro (dinitroderivative of cresol and phenol) were applied at ½ gallon per acre 21 days after cracking. Trace elements of 20.5% solubor (boron)

mixed with 26% $MnSO_4$ were also added to the soil in amounts of 2½ lbs. and 2 lbs. per acre respectively.

During the duration of the testing, two cultivations were made with a rotary hoe and two cultivations with a high speed peanut hoe in acordance with conventional techniques.

The thus planted field was then sectioned into seven plots of equal size for testing. The plots and treatments applied are as follows:

TABLE IV

| Plot | Treatment |
|---|---|
| Check | Landplaster plus five subsequent applications with 20 lbs./acre per application of dust fungicide. |
| 1 | 5 applications of 20 lbs./acre per application of dust No. 1. |
| 2 | 5 applications of 30 lbs./acre per application of dust No. 1. |
| 3 | 5 applications of 20 lbs./acre per application of dust No. 2. |
| 4 | 5 applications of 1 gal. per application fungicide spray plus 1 gal. per application of spray No. 1. |
| 5 | 5 applications of 1 gal. per application fungicide spray plus 1 gal. per application of spray No. 2. |
| 6 | 5 applications of 1 gal. per application fungicide spray plus 2 gal. per application of spray No. 1. |

The check plot was designed to simulate conventional landplaster peanut crop farming in North Carolina. It consisted of applying to the soil 700 lbs. of gypsum on July 29. The fungicide used in the check plot consisted of a conventional CuS fungicide of 4% Cu and 75% S (particle size about 44 microns) plus 5% DDT (insecticide of dichloro diphenyl trichloroethane). Dust No. 1 consisted of 40 parts by weight $CaSO_4$ having an average particle size of about 5 microns, 45 parts by weight sulphur and 3.2 parts by weight copper oxide (2.4 parts by weight copper as metallic). Dust No. 2 was the same as dust No. 1 except that it contained 1% (of total weight) diethylene glycol ethyl ether. Spray No. 1 consisted of 7.5 lbs. per gallon of $CaSO_4$ having a particle size of about 2 microns. The fungicide spray consisted of an aqueous mixture of 5.0 lbs./gal. sulfur; 0.48 lbs./gal. copper sulfate; and 1.0 lb./gal. DDT Spray No. 2 was the same as spray No. 1 except that it contained 1% (total weight of spray) diethylene glycol ethyl ether. All sprays were aqueous dispersions. In plots 4–6 the liquid fungicide (including DDT) was admixed with the spray and both were applied together in a single application.

As stated above, the various applications were applied using conventional equipment 5 times during the growing season as follows:

Application 1: July 8
Application 2: July 22
Application 3: August 6
Application 4: August 21
Application 5: September 3

In mid-October the crops were harvested and four days later were combined. The following table shows physical yield, the grades, and economic yields. Grades and prices were determined by the Official Federal gradation service:

TABLE V

| Plot No. | Percent: Sound mature kernels | Other kernels | Extra large kernels | Fancies | Loose kernel shells | Yield (lbs./A.) | Grade price, per cwt. ($) | Value ($) per acre |
|---|---|---|---|---|---|---|---|---|
| Check | 69 | 3 | 39 | 79 | 1 | 3,764 | 13.27 | 499.48 |
| 1 | 69 | 2 | 42 | 72 | 1 | 4,125 | 13.26 | 546.97 |
| 2 | 72 | 3 | 38 | 74 | 1 | 4,146 | 13.78 | 571.31 |
| 3 | 71 | 2 | 49 | 83 | 2 | 4,156 | 13.77 | 572.28 |
| 4 | 71 | 3 | 40 | 80 | 1 | 4,068 | 13.64 | 554.87 |
| 5 | 72 | 2 | 52 | 89 | 1 | 4,244 | 14.01 | 594.58 |
| 6 | 73 | 2 | 42 | 81 | 1 | 4,410 | 13.96 | 651.63 |

This test data in Examples 1–2 clearly indicates that not only are the techniques of this invention in many instances superior to conventional landplaster in that they effect better yields, but that in many instances they effect superior quality of yield as well. In this respect, an analysis of the above data indicates that in only one instance out of the many tests conducted did a plot fail to yield a superior quality to the check (see Example 1, Area A, Treatment 3). This seemingly inconsistent result appears to be fully explanable on the basis of experimental error and thus in no way negated the above statement concerning superior quality.

EXAMPLE 3

Twenty peanut plants were planted in greenhouse flats using a rather high humous potting soil. These twenty plants were divided into five groups of four plants each. The first group received no calcium sulfate treatment at all. The second group was treated with a calcium sulfate colloidal suspension by applying the suspension to the foliage of the plants. The colloidal suspenison was formulated from calcium sulfate labelled with a small amount of radioactive calcium-45, previously air-milled to a particle size of less than 2 microns. To this calcium-containing compound was then added 5% lignin sulfonate based upon the weight of the calcium sulfate. This admixture was then added with stirring to sufficient water so as to form a colloidal suspension of, by weight, 50% water and 50% solids.

The last three groups of plants were treated by applying thereto the same basic colloidal suspension which in addition had therein in an amount of 1% by weight of the calcium sulfate, a glycol ether. Group 3 used diethylene glycol methyl ether. Group 4 used diethylene glycol ethyl ether. Group 5 used ethylene glycol ethyl ether.

These plants, three weeks later, were transplanted to one quart pots and again 5 weeks thereafter into 5 gallon containers. Each plant was fed with a balance 6–6–6 plant food containing other essential trace elements at a rate of one teaspoonful per plant. The plants were watered regularly with the water applied directly to the soil with care taken not to wash down the leaves. Approximately thirty days after planting, at one week intervals for 5 consecutive weeks, a fine mist of water was applied from a garden atomizer directly to the leaves in sufficient amount to wet the leaves but not to cause water drops to form on the leaves and fall to the soil. During the second transplanting it was noted qualitatively that all of the plants that had received calcium sulfate appeared in general to be more vigorous, more mature, larger and with more blooms than the control group that had received no calcium. During the process of making the second transplantation, several well-formed peanuts were noted within the root balls of the plants. A few of these peanuts and several blooms were placed on an X-ray film and exposed for an autoradiogram. After two weeks' exposure the film was developed and numerous areas of darkening were observed both for the nuts and the blooms. The heaviest exposures were observed for the nuts. Approximately sixty days after planting, half of the plants were uprooted for yield study and autoradiographic measurement and the following data were obtained:

TABLE IV

| Sample No. | Plant weight (gms.) Roots | Tops | Total | Yield Pegs (in soil) | Nuts |
|---|---|---|---|---|---|
| Untreated plant 1 (group 1) | 13.0 | 55.6 | 68.6 | 6 | 1 |
| Untreated plant 2 (group 1) | 4.0 | 20.1 | 24.1 | 0 | 0 |
| Treated plant 1 (group 2) | 12.3 | 18.4 | 30.7 | 5 | 4 |
| Treated plant 2 (group 2) | 9.1 | 24.0 | 33.1 | 6 | 2 |
| Treated plant 5 (group 3) | 9.2 | 23.4 | 32.6 | 8 | 1 |
| Treated plant 6 (group 3) | 20.2 | 50.2 | 70.4 | 11 | 5 |
| Treated plant 9 (group 4) | 13.0 | 35.7 | 48.7 | 12 | 2 |
| Treated plant 10 (group 4) | 11.8 | 47.6 | 59.4 | 8 | 3 |
| Treated plant 13 (group 5) | 8.0 | 27.3 | 35.3 | 11 | 1 |
| Treated plant 14 (group 5) | 6.1 | 42.7 | 48.8 | 6 | 0 |

Correlating these results into averages it is seen that even in the early growing season the treatment with calcium sulfate has produced a significant plant response. Such a correlation is set forth as follows:

TABLE VII

| Group No: | Average total plant wt. (gms.) | Average yield Pegs | Nuts |
|---|---|---|---|
| Untreated Group 1 | 46.4 | 3 | 0.5 |
| Treated: | | | |
| Group 2 | 31.9 | 5.5 | 3.0 |
| Group 3 | 51.5 | 9.5 | 3.0 |
| Group 4 | 54.1 | 10.0 | 2.5 |
| Group 5 | 42.1 | 8.5 | 0.5 |

As can be clearly seen, the treatment of peanut crops with a calcium-containing compound of reduced particle size even during the early stages of the growing season shows a material increase in the number of pegs and nuts formed. As to Group 5, the number of pegs was materially increased. After further growing, Group 5 will develop a high amount of nuts as well.

Autoradiographic measurements of the root portions of the uprooted treated plants indicate that at least a portion of the calcium reached the peanuts and blooms by way of assimilation and transport by the leaves.

EXAMPLE 4

Sixteen seed peanuts were planted in greenhouse flats using North Carolina peanut soil. The sixteen plants were divided into seven groups of two plants each, and two groups of one plant each and treated generally in the same manner as reported in Example 3. The first group received no calcium sulfate treatment at all. The second group was treated with a calcium sulfate colloidal aqueous suspension having an average particle size of about 2 microns. The suspension also contained 5% lignin sulfonate based on the weight of the calcium. The third group was treated with the same basic colloidal solution with the lignin sulfonate. The last six groups were treated by applying thereto the same basic colloidal suspension which, in addition, had therein an amount of 1% by weight of the calcium sulfate, a glycol ether. Group 4 used diethylene glycol ethyl ether with lignin sulfonate; Group 5, diethylene glycol ethyl ether without lignin sulfonate. Group 6 used diethylene glycol methyl ether with lignin sulfonate; Group 7, diethylene glycol methyl ether without lignin sulfonate. Group 8 used ethylene glycol ethyl ether with lignin sulfonate; Group 9 used ethylene glycol ethyl ether without lignin sulfonate. The suspensions above were formulated according to Example 3. The following results were obtained after the plants had developed and pegs had entered the soil, but before normal maturity:

TABLE VIII

| Sample No. | Total plant weight (gms.) | Yield Pegs (in soil) | Nuts |
|---|---|---|---|
| Untreated plant 1 (Group 1) | 58.3 | 2 | 0 |
| Untreated plant 2 (Group 1) | 89.8 | 3 | 18 |
| Treated plant 3 (Group 2) | 48.1 | 3 | 9 |
| Treated plant 4 (Group 2) | 85.8 | 6 | 19 |
| Treated plant 5 (Group 3) | 73.6 | 7 | 13 |
| Treated plant 6 (Group 3) | 43.7 | 4 | 5 |
| Treated plant 7 (Group 4) | 75.0 | 4 | 10 |
| Treated plant 8 (Group 4) | 86.8 | 5 | 12 |
| Treated plant 9 (Group 5) | 65.4 | 3 | 9 |
| Treated plant 10 (Group 5) | 48.3 | 2 | 6 |
| Treated plant 11 (Group 6) | 102.8 | 15 | 19 |
| Treated plant 12 (Group 6) | 105.2 | 15 | 13 |
| Treated plant 13 (Group 7) | 102.4 | 9 | 10 |
| Treated plant 14 (Group 7) | 53.3 | 3 | 8 |
| Treated plant 15 (Group 8) | 47.7 | 0 | 19 |
| Treated plant 16 (Group 9) | 64.5 | 6 | 0 |

With only two exceptions, the larger, more productive plants are those which received the lignin sulfonate along with the $CaSO_4$, regardless of the ether used or its presence. Those which got the diethylene glycol methyl ether seemed to be best of all. Correlating these results into averages, it is seen that even in the early growing stage the foliar treatment with calcium sulfate has produced a significant plant response. Such correlation is set forth as follows:

TABLE IX

| Group No. | Average total plant weight (gms.) | Average yield Pegs | Nuts |
|---|---|---|---|
| Untreated Group 1 | 74.0 | 2.5 | 9.0 |
| Treated: | | | |
| Group 2 | 66.9 | 4.5 | 14.0 |
| Group 3 | 63.6 | 5.5 | 9.0 |
| Group 4 | 80.9 | 4.5 | 11.0 |
| Group 5 | 56.8 | 2.5 | 7.5 |
| Group 6 | 104.0 | 15.0 | 16.0 |
| Group 7 | 77.8 | 6.0 | 9.0 |
| Group 8 | 47.7 | 0.0 | 10.0 |
| Group 9 | 64.5 | 6.0 | 9.0 |

EXAMPLE 5

To the foliage of a peanut crop normally requiring a landplaster technique of approximately 700 lbs./acre of gypsum there is applied with a hand duster at first bloom a mixture of 40 parts (by weight) $CaSO_4$ with a particle size less than 20 microns, 45 parts (by weight) sulphur and 3.2 parts (by weight) copper oxide (2.4 parts copper as metallic) at the rate of 30 pounds per acre. This mixture is again applied in a similar manner and at a similar rate 5 more times, equally speed (in time) from each other, over the entire length of the growing season. The peanut crop during growth exhibits healthier, more vigorous, darker green plants than if no $CaSO_4$ were used. The treatment also materially reduces upon harvest the number of "pops" and unsound kernels that form when $CaSO_4$ is not used.

EXAMPLE 6

A similar procedure as in Example 5 is followed on another crop except that the micron size of $CaSO_4$ is less than 2 microns and the rate of application in each of the six foliage dustings in 10 lbs./acre. The peanut plants during growth exhibit the same vigorous, healthy characteristics as in Example 2. The harvest reveals that the problem of "pops" and unsound kernels has been substantially eliminated as a practical problem.

EXAMPLE 7

The same procedure as in Example 5 is followed except that instead of the $CaSO_4$, there is employed calcium oxide in the form of basic slag which has previously been reduced to particles, submicron in size. The harvest reveals that the number of "pops" and unsound kernels normally expected if no calcium is provided, has been materially reduced to a point where the problem of "pops"

and unsound kernels no longer presents a practical problem.

EXAMPLE 8

To a field of peanuts that has been treated with 200 lbs. of landplaster (particle size 100–200 microns) per acre at the time of early bloom, there is applied to the foliage of the peanut plants 6 equally spaced times during the growing season a mixture of 400 parts (by weight) $CaSO_4$ having a particle size less 20 microns, 45 parts (by weight) sulphur, and 3.2 parts (by weight) copper oxide (2.4 parts by weight copper as metallic). The 6 applications are effected with a tractor-mounted duster at a rate of 20 pounds per acre. During their growth the peanut plants appear more vigorous, healthier, and darker green, and have thicker and heavier foliage than if only 200 lbs./acre of landplaster is used. The treatment, using the same basis for comparison, shows fewer "pops" and gives an increased yield of sound peanuts.

EXAMPLE 9

Two adjacent fields of peanut plants are treated as follows, both fields having similar initial soil conditions:

To the first field there is applied in a conventional manner at early bloom a 16" band over each plant row of $CaSO_4$ having a particle size of from about 100 to 200 microns. This treatment, known as the landplaster technique hereinbefore discussed, is applied at a rate of 800 pounds $CaSO_4$ per acre. This crop is then sprayed six equally spaced times during the growing season with a dilute spray of a fungicide-insecticide consisting of a water slurry of 1 pound DDT per gallon of spray, 6 pounds sulphur per gallon of spray and 0.48 pounds basic copper sulphate per gallon of spray. The spraying device used is a typical tractor-mounted sprayer set to spray at a rate of 20 gallons per acre.

In treating the second field, the landplaster technique is omitted and starting from early bloom (i.e., the same time the landplaster technique is applied to the first field) the foliage of the peanut plants is sprayed with a dilute spray consisting of 7.5 pounds per gallon of spray $CaSO_4$ having a particle size less than 2 microns, 1 pound DDT per gallon of spray, 6 pounds sulphur per gallon of spray, and 0.48 pounds basic copper sulphate per gallon of spray. The same tractor-mounted spraying device is used as for the first field and applies the spray at a rate of 20 pounds per acre. During the growing season, 5 additional equally spaced (in time) applications of the foliage are effected, the last application being effected one week prior to harvest, using the same dilute $CaSO_4$ containing spray at the same rate as for the first application.

A comparison of the two fields during the growing season reveals the same degree of vigor, health and thickness of peanut plants in each field. At harvest basically the same very small number of "pops" and unsound kernels appear in both fields.

Once given the above disclosure, many other features, variations and modifications of this invention will become apparent to the skilled artisan. Such features, variations and modifications are therefore included within the scope of this invention disclosure.

I claim:

1. In the method of treating a peanut plant by applying to the soil at the point of pegging, a layer of a calcium-containing compound, the improvement which comprises, the separate and additional application, but to the foliage of said peanut plant, of a composition consisting of, as an active ingredient, a calcium-containing compound having a particle size less than about 20 microns such that, upon the application of said active ingredient to the surfaces of the foliage of the peanut plant, said active ingredient is introduced into the structure of said plant, the combined application both to the soil and to the surfaces of the foliage of the peanut plant being in an amount and at a rate per acre of said crop sufficient to reduce the formation of peanut pops and unsound kernels in the peanuts yielded by said crop.

2. A method of treating a peanut crop comprising applying to the foliage of said peanut crop a sufficient amount of a composition comprised of, as an active ingredient, a calcium containing compound having a sub-micron particle size, to substantially reduce the formation of pops and unsound kernels.

3. A method according to claim 2 wherein said calcium containing compound is calcium sulfate.

4. A method according to claim 2 wherein said calcium containing compound is applied in an amount of about 15–80 pounds per acre per crop.

5. A method according to claim 2 wherein said composition also includes a fungicide.

6. A method according to claim 2 wherein said composition also includes lignin sulfonate.

7. A method according to claim 2 wherein said composition also includes a glycol ether.

8. A method according to claim 2 wherein said composition is applied to the foliage of said peanut crop as a liquid spray.

9. A method for reducing peanut pops and unsound kernels in the peanuts yielded by a peanut crop growing in a medium suitable for normal peanut growth comprising applying to the surfaces of the foliage of said peanut crop a composition containing, as an essential active ingredient, a calcium containing compound having a sub-micron particle size such that, upon the application of said composition, said active ingredient is introduced into the structure of said plant, said composition being applied to said crop in an amount and at a rate per acre of said crop sufficient to reduce the formation of peanut pops and unsound kernels in the peanuts yielded by said crop.

10. A method according to claim 9 wherein said calcium containing compound is applied at a rate of about 15–80 pounds per acre per crop.

11. In the method of treating a peanut plant by applying to the soil at the point of pegging, a layer of calcium containing compound, the improvement which comprises, the additional application, but to the foliage of said peanut plant, of a composition containing, as an active ingredient, a calcium containing compound having a sub-micron particle size such that, upon the application of said active ingredient to the surfaces of the foliage of the peanut plant, said active ingredient is introduced into the structure of said plant, the combined application both to the soil and to the surfaces of the foliage of the peanut plant being in an amount and at a rate per acre of said crop sufficient to reduce the formation of peanut pops and unsound kernels in the peanuts yielded by said crop.

12. A method for reducing peanut pops and unsound kernels in the peanuts yielded by a peanut crop growing in a medium suitable for normal peanut growth comprising applying to the surfaces of the foliage of said peanut crop a composition containing, as an essential active ingredient, a calcium containing compound having a particle size of less than about 20 microns such that, upon the application of said active ingredient, said compound is introduced into the structure of said plant, said composition also including a glycol ether and being applied to said crop in an amount and at a rate per acre of said crop sufficient to reduce the formation of peanut pops and unsound kernels in the peanuts yielded by said crop.

13. A method according to claim 12 wherein said calcium containing compound is applied at a rate of about 15–80 pounds per acre per crop.

14. A method for reducing peanut pops and unsound kernels in the peanuts yielded by a peanut crop growing in a medium suitable for normal peanut growth comprising applying to the surfaces of the foliage of said peanut crop a composition containing, as an essential active ingredient, a calcium containing compound having a particle size of less than about 20 microns such that, upon the application of said active ingredient, said compound is introduced into the structure of said plant, said composition also including a lignin sulfonate and being applied to said crop in an amount and at a rate per acre of said crop sufficient to reduce the formation of peanut pops and unsound kernels in the peanuts yielded by said crop.

15. A method according to claim 14 wherein said calcium containing compound is applied at a rate of about 15–80 pounds per acre per crop.

16. The method of claim 15 wherein said composition also includes a glycol ether.

17. In the method of treating a peanut plant by applying to the soil at the point of pegging, a layer of calcium containing compound, the improvement which comprises, the additional application, but to the foliage of said peanut plant, of a composition containing, as an active ingredient, a calcium containing compound having a particle size less than about 20 microns such that, upon the application of said active ingredient to the surfaces of the foliage of the peanut plant, said active ingredient is introduced into the structure of said plant, the combined application both to the soil and to the surfaces of the foliage of the peanut plant being in an amount and at a rate per acre of said crop sufficient to reduce the formation of peanut pops and unsound kernels in the peanuts yielded by said crop, said composition applied to the foliage of said peanut plant also including a glycol ether.

18. In the method of treating a peanut plant by applying to the soil at the point of pegging, a layer of a calcium containing compound, the improvement which comprises, the additional application, but to the foliage of said peanut plant, of a composition containing, as an active ingredient, a calcium containing compound having a particle size less than about 20 microns such that, upon the application of said active ingredient to the surfaces of the foliage of the peanut plant, said active ingredient is introduced into the structure of said plant, the combined application both to the soil and to the surface of the foliage of the peanut plant being in an amount and at a rate per acre of said crop sufficient to reduce the formation of peanut pops and unsound kernels in the peanuts yielded by said crop, said composition applied to the foliage of said peanut plant also including lignin sulfonate.

19. A method of treating a peanut crop comprising applying to the foliage of said peanut crop a pop and unsound kernel reducing amount of a calcium containing compound consisting of particles less than about 20 microns in size.

20. A method according to claim 19 wherein said compound is applied to the foliage in the form of a liquid spray.

21. A method according to claim 20 wherein said liquid spray is in the form of a slurry.

22. A method according to claim 19 wherein said compound is applied to the foliage in the form of a dust.

23. A method according to claim 19 wherein substantially all of the particles of said compound are submicron in size.

24. A method according to claim 19 wherein said compound is applied in the amount of about 15–80 pounds per acre per crop.

25. A method according to claim 19 wherein there is admixed with said compound, a fungicide.

26. A method according to claim 19 wherein there is admixed with said compound, lignin sulfonate.

27. A method according to claim 19 wherein there is admixed with said compound, a glycol ether.

28. A method according to claim 27 wherein there is admixed, lignin sulfonate.

29. A method according to claim 19 wherein said compound is calcium sulfate.

30. A method according to claim 19 wherein said compound is applied in a plurality of separate and distinct applications over the growing season of said crop, the total of said application equaling about 10–80 pounds per acre per crop based upon the weight of said compound.

31. A method according to claim 19 wherein said application of said compound to foliage of the peanut crop is at least equally as effective to inhibit the formation of pops and unsound kernels as the application of about 500 pounds per acre per growing season of landplaster to the pegging zone of said crop.

References Cited

FOREIGN PATENTS

| | | |
|---|---|---|
| 966,624 | 8/1964 | Great Britain. |
| 154,888 | 9/1921 | Great Britain. |
| 407,000 | 3/1934 | Great Britain. |
| 431,145 | 7/1935 | Great Britain. |
| 464,836 | 4/1937 | Great Britain. |
| 515,601 | 12/1939 | Great Britain. |
| 942,067 | 11/1963 | Great Britain. |

OTHER REFERENCES

Kirk-Othmer, Encyclopedia of Chemical Technology, vol. 4, p. 11.

Middleton et al., Jour. Amer. Soc. Agron., 37; 443–457 (1945).

Caldwell et al., Jour. Amer. Soc. Agron., 37; 413–428 (1945).

Reed et al., Chemical Abstracts, vol. 42, col. 5150 (F) and Soil Science 65, 103–109 (1948).

Lockover, Chemical Abstracts, vol. 65, col. 14375(e) and Inst. Volani Recgs. Agron., Rehovoth Israel 21(a) 83–9 1966.

JAMES O. THOMAS, Jr., Primary Examiner

U.S. Cl. X.R.

71—4

UNITED STATES PATENT OFFICE

CERTIFICATE OF CORRECTION

Patent No. 3,846,116 Dated November 12, 1974

Inventor(s) Melton T. Pearson

It is certified that error appears in the above-identified patent and that said Letters Patent are hereby corrected as shown below:

Column 2, line 67 between "plant" and "According" cancel the comma "," and insert a period "." therefor.

Column 5, line 45 cancel "this" and substitute -- these

Column 5, line 71 cancel "in" and substitute -- is -- therefor.

Column 9, line 39 cancel "teratments" and substitute -- treatments -- therefor.

Claim 30, line 4, cancel "10" and substitute therefor -- 15 --.

Signed and sealed this 22nd day of April 1975.

(SEAL)
Attest:

RUTH C. MASON
Attesting Officer

C. MARSHALL DANN
Commissioner of Patents and Trademarks